(12) United States Patent
Chang et al.

(10) Patent No.: US 9,897,906 B2
(45) Date of Patent: Feb. 20, 2018

(54) PROJECTION SCREEN

(71) Applicant: Coretronic Corporation, Hsin-Chu (TW)

(72) Inventors: Kun-Rong Chang, Hsin-Chu (TW); Chung-Lung Yang, Hsin-Chu (TW); Pen-Ning Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/202,575

(22) Filed: Jul. 6, 2016

(65) Prior Publication Data
US 2017/0082914 A1   Mar. 23, 2017

(30) Foreign Application Priority Data

Sep. 18, 2015   (TW) .............................. 104130885 A

(51) Int. Cl.
| | |
|---|---|
| *G03B 21/56* | (2006.01) |
| *G03B 21/58* | (2014.01) |
| *G06F 3/14* | (2006.01) |
| *F16B 2/22* | (2006.01) |
| *F16B 7/04* | (2006.01) |

(52) U.S. Cl.
CPC ............. *G03B 21/56* (2013.01); *G03B 21/58* (2013.01); *G06F 3/14* (2013.01); *F16B 2/22* (2013.01); *F16B 7/0426* (2013.01); *G09G 2300/026* (2013.01)

(58) Field of Classification Search
CPC ........ G03B 21/50; G03B 21/58; G03B 21/56; F16B 2/20

USPC .... 359/449, 460, 443; 345/4–5, 1.1, 1.3, 2.3
See application file for complete search history.

(56) References Cited

U.S. PATENT DOCUMENTS

| | | | | |
|---|---|---|---|---|
| 5,400,178 A | * | 3/1995 | Yamada | ................. G03B 21/62 |
| | | | | 359/443 |
| 5,673,145 A | * | 9/1997 | Wilson | .................... G03B 21/02 |
| | | | | 348/E5.144 |
| 6,324,000 B1 | | 11/2001 | Soulis | |
| 6,543,164 B1 | * | 4/2003 | Sperl | ................... G09F 15/0068 |
| | | | | 40/605 |

(Continued)

FOREIGN PATENT DOCUMENTS

| | | |
|---|---|---|
| CN | 201569847 | 9/2010 |
| CN | 203965790 | 11/2014 |

(Continued)

OTHER PUBLICATIONS

"Office Action of Taiwan Counterpart Application", dated Nov. 3, 2016, p. 1-p. 4, in which the listed references were cited.

(Continued)

*Primary Examiner* — Christopher Mahoney
(74) *Attorney, Agent, or Firm* — JCIPRNET

(57) ABSTRACT

A projection screen includes a plurality of projection plates and at least one fixing component. Each of the projection plates has a projection surface and at least one connection side. Through the connection sides, the projection surfaces of the projection plates lean against each other to be coplanar. The fixing component includes two fixing sections connected with each other, wherein the two connection sides leant against each other are clipped at the two fixing sections, respectively.

15 Claims, 6 Drawing Sheets

(56) References Cited

U.S. PATENT DOCUMENTS

| | | | |
|---|---|---|---|
| 6,788,460 B2 * | 9/2004 | Knox | G02B 5/1876 359/456 |
| 7,914,160 B2 | 3/2011 | Sugano | |
| 2007/0285337 A1 | 12/2007 | Maddock | |
| 2011/0069015 A1 * | 3/2011 | Nurmi | G06F 3/041 345/173 |
| 2013/0027332 A1 | 1/2013 | Yang | |

FOREIGN PATENT DOCUMENTS

| | | |
|---|---|---|
| JP | H01134491 | 5/1989 |
| JP | 2001183993 | 7/2001 |
| JP | 2005316296 | 11/2005 |
| JP | 2009270386 | 11/2009 |
| TW | M278720 | 10/2005 |
| TW | 201035667 | 10/2010 |
| TW | 201245847 | 11/2012 |
| TW | 201344337 | 11/2013 |
| TW | M507527 | 8/2015 |

OTHER PUBLICATIONS

"Office Action of China Counterpart Application," dated Dec. 14, 2017, p1-p7, in which the listed references were cited.

* cited by examiner

PROJECTION SCREEN

CROSS-REFERENCE TO RELATED APPLICATION

This application claims the priority benefit of Taiwan application serial no. 104130885, filed on Sep. 18, 2015. The entirety of the above-mentioned patent application is hereby incorporated by reference herein and made a part of this specification.

BACKGROUND

1. Field of the Invention

The invention generally relates to a projection screen, and more particularly, to a projection screen spliced with a plurality of projection plates.

2. Description of Related Art

An interactive projection system is a type of projection system that allows a user to perform touch operations on a projection screen, and a touch operation area of the projection screen is configured to receive touch inputs executed by the user.

In general, the projection screen needs to have a sufficiently large projection surface for a projection device to project an image, and the conventional 100-inch projection screen would have an even larger size after the addition of other structural parts such as an outer frame and so forth. This type of large-size projection screen is not convenient in terms of transportation, and sizes of common elevators and doors might not be large enough for the large-size projection screen to enter. As a result, crane machines and tools are required for the transportation of the projection screen, and thus transportation and installation costs of the projection screen would be substantially increased.

The information disclosed in this "BACKGROUND" section is only for enhancement of understanding of the background of the described technology and therefore it may contain information that does not form the prior art that is already known to a person of ordinary skill in the art. Further, the information disclosed in the "BACKGROUND" section does not mean that one or more problems to be resolved by one or more embodiments of the invention were acknowledged by a person of ordinary skill in the art.

SUMMARY

The invention is directed to a projection screen convenient to transport and install.

The other purposes and advantages of the invention may be further understood from the technical features of the disclosures of the invention.

For achieving the foregoing at least one of the purposes or the other purposes, in one embodiment of the invention, a projection screen including a plurality of projection plates and at least one fixing component is provided. Each of the projection plates has a projection surface and at least one connection side. Through the connection sides, the projection surfaces of the projection plates lean against each other to be coplanar. The fixing component includes two fixing sections connected with each other, and the two connection sides leant against each other are clipped at the two fixing sections, respectively.

In one embodiment of the invention, the projection surfaces are adapted to receive a projection beam from a projection device.

In one embodiment of the invention, each of the projection plates is a touch projection plate, and the projection surfaces together constitute a touch projection surface.

In one embodiment of the invention, each of the fixing sections includes two clipping portions and a connection portion, each of the connection portions is connected between the two corresponding clipping portions, and each of the connection sides is clipped between the two corresponding clipping portions.

In one embodiment of the invention, the two fixing sections are integrally connected with each other.

In one embodiment of the invention, each of the projection plates includes a plate body and at least one first sidebar, each of the projection surfaces is formed at the corresponding plate body, and each of the first sidebars is disposed at the corresponding connection side and clipped at the corresponding fixing section.

In one embodiment of the invention, the projection screen further includes at least one lap joint lapping at the two first sidebars leant against each other.

In one embodiment of the invention, each of the projection plates further includes a plurality of second sidebars, the second sidebars of each of the projection plates and the at least one first sidebar constitute a frame body, and each of the frame bodies frames the corresponding plate body.

In one embodiment of the invention, each of the first sidebars and one of the adjacent second sidebars are together clipped at the corresponding fixing section.

In one embodiment of the invention, the number of the at least one fixing component is a plurality, and two opposite sides of each of the first sidebars are clipped at the two corresponding fixing components, respectively.

In one embodiment of the invention, the projection screen further includes at least one bracket, the bracket is connected to the projection plates, and a width of the bracket is greater than a width of the fixing component.

In one embodiment of the invention, each of the projection plates has at least one connector, each of the connectors is disposed at the corresponding connection side, and the projection plates are electrically connected with each other through the connectors.

In one embodiment of the invention, the projection screen further includes a control unit, and the control unit is disposed at one of the projection plates and is adapted to control the projection plates.

In one embodiment of the invention, the projection screen further includes a main control unit and a plurality of sub-control units, the sub-control units are respectively disposed at the projection plates and electrically connected to the main control unit, and the main control unit is adapted to control the projection plates through the sub-control units.

Based on the foregoing descriptions, the embodiments of the invention have at least one of the advantages below. In the embodiments of the invention, the projection screen is formed by assembling/splicing a plurality of projection plates, and the projection plates may be separated from each other and be stacked to have a shorter length and a shorter width, so the projection screen is convenient to transport and install. Moreover, in the embodiments of the invention, by the two fixing sections of the fixing components to respectively clipping at the two connection sides of two adjacent projection plates, the two adjacent projection plates may be firmly bonded with each other and the two projection surfaces of the two adjacent projection plates may together constitute a planar surface, and thus the projection screen may present a good/favorable projection image.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the teems "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
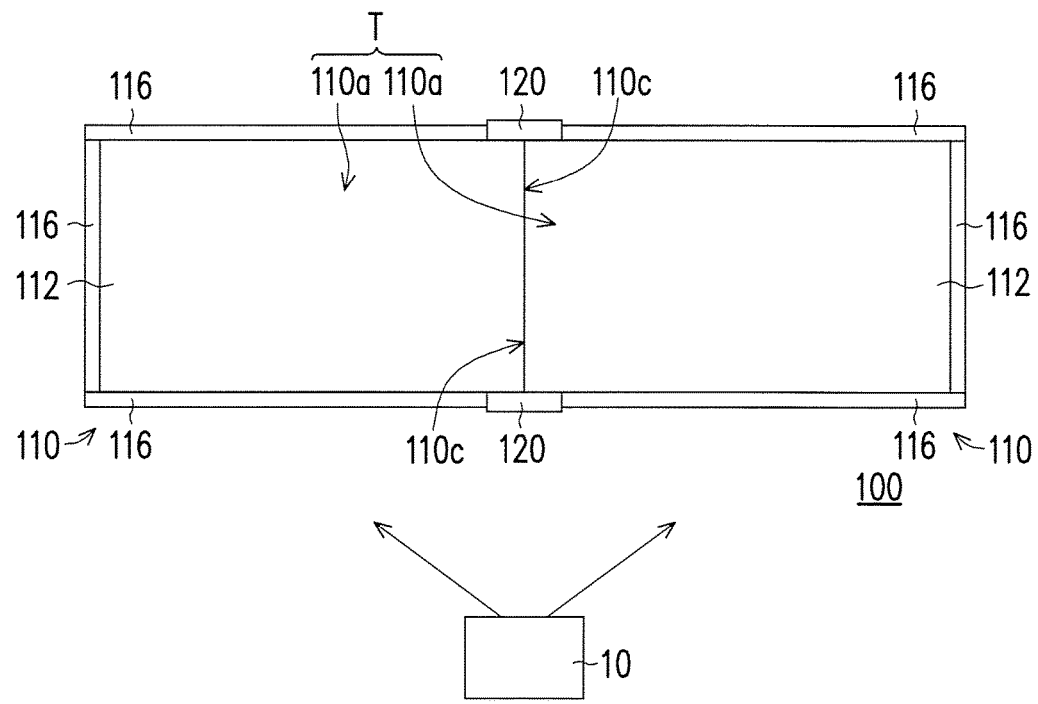
FIG. 1 is a schematic diagram illustrating a projection screen and a projection device according to one embodiment of the invention.
Figure 2:
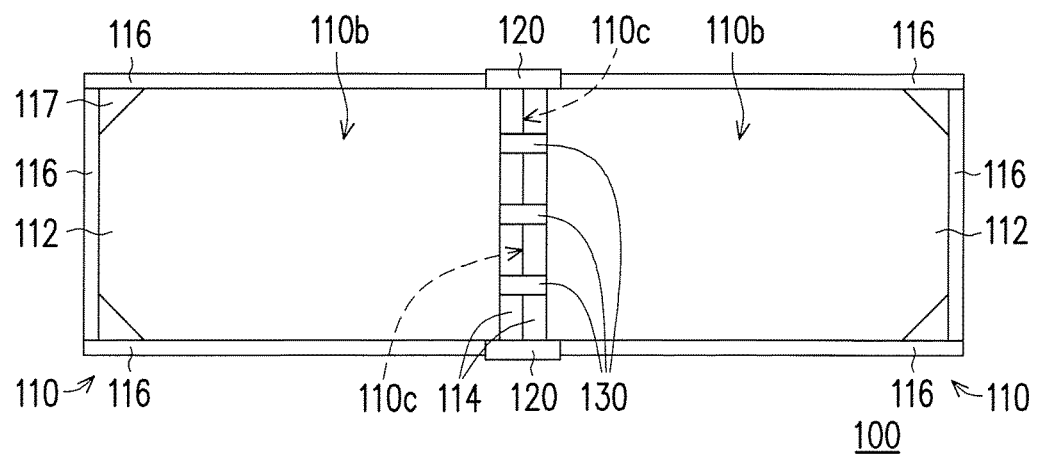
FIG. 2 is a rear view of the projection screen of FIG. 1.
Figure 3:
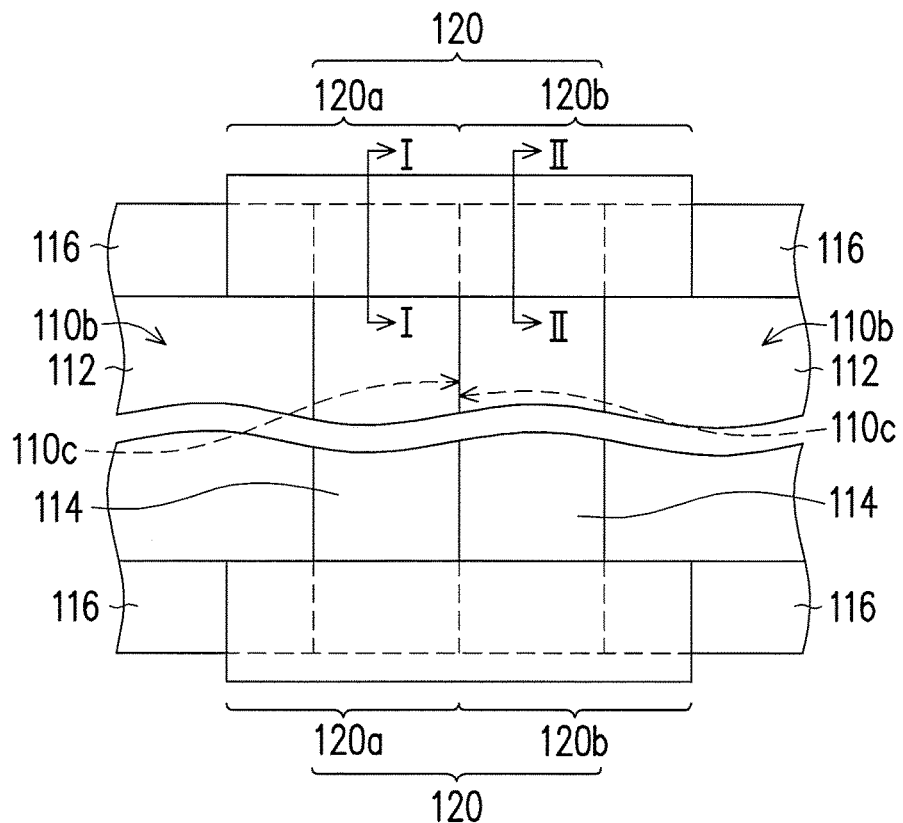
FIG. 3 is a partial enlarged view of the projection screen of FIG. 2.

FIG. 1 is a schematic diagram illustrating a projection screen and a projection device according to one embodiment of the invention, wherein FIG. 1 illustrates the front view of the projection screen. FIG. 2 is a rear view of the projection screen of FIG. 1. FIG. 3 is a partial enlarged view of the projection screen of FIG. 2. Referring to FIG. 1 through FIG. 3, the projection screen 100 of the embodiment includes a plurality of projection plates 110 (illustrated as two for an example) and at least one fixing component 120 (illustrated as two for an example). In the embodiment, each of the projection plates 110 has a projection surface 110a, a back surface 110b opposite to the projection surface 110a, and at least one connection side 110c. In the embodiment, through the connection sides 110c, the projection surfaces 110a of the projection plates 110 lean against each other to be coplanar. More specifically, as shown in FIG. 1 and FIG. 2, through a mutual connection between the connection side 110c of the projection plate 110 at the left side and the connection side 110c of the projection plate 110 at the right side, the projection surface 110a of the projection plate 110 at the left side and the projection surface 110a of the projection plate 110 at the right side lean against each other to be coplanar. In addition, in the embodiment, each of the projection plates 110 is, for example, a reflective projection plate having a touch function, and the projection surfaces 110a together constitute a planar touch projection surface T. In the embodiment, the projection screen 100 is adapted to receive a projection beam from the projection device 10 to form an projection image. To be more specific, in one embodiment, the projection device 10 is disposed at a side of the projection surfaces 110a of the projection plates 110, the projection surface 110a of the projection screen 100 may receive a projection beam from the projection device 10 and the projection beam may be imaged on the touch projection surface T. Each of the projection surfaces 110a of the projection plates 110 of the projection screen 100 may, for example, have a white reflective layer (not shown, but the invention is not limited thereto), which may reflect the projection beam to an observer's eye.

Moreover, in other embodiment, the two projection plates 110 in FIG. 1 and FIG. 2 may also be fixed through a single fixing component 120, such as merely through the top fixing component 120 or merely through the bottom fixing component 120, but the invention is not limited thereto.

As shown in FIG. 3, each of the fixing components 120 of the embodiment includes two fixing sections 120a and 120b integrally connected with each other, and the connection sides 110c of the two projection plates 110 leant against each other are respectively clipped at the two fixing sections 120a and 120b of each of the fixing components 120. In detail, two ends of the connection side 110c of one of the projection plates 110 are respectively clipped by/at the two corresponding fixing sections 120a (i.e., the fixing section 120a of the top fixing component 120 and the fixing section 120a of the bottom fixing component 120), and two ends of the connection side 110c of other one of the projection plates 110 are respectively clipped by/at the two corresponding fixing sections 120b (i.e., the fixing section 120b of the top fixing component 120 and the fixing section 120b of the bottom fixing component 120). However, in other embodiments, the two fixing sections 120a and 120b may also be not integrally formed.

Under the abovementioned configuration, the projection screen 100 is assembled with a plurality of projection plates 110, and the projection plates 110 may be separated from each other and be stacked to have a shorter length and a shorter width, so that the projection screen 100 may be convenient to transport and install. In addition, by using the two fixing sections 120a and 120b of the fixing components 120 to respectively clip at the two connection sides 110c of two adjacent projection plates 110, the two adjacent projection plates 110 may be firmly combined/bonded with each other and the two projection surfaces 110a of the two adjacent projection plates 110 may together constitute the planar touch projection surface T, and thus the projection screen 100 may present a good/favorable projection image, thereby enabling a user to smoothly perform a touch input. A length or a width of the projection screen 100 of the embodiment may be 100 inches or other appropriate sizes, and it is not limited by the invention.

Figures 4A, 4B:
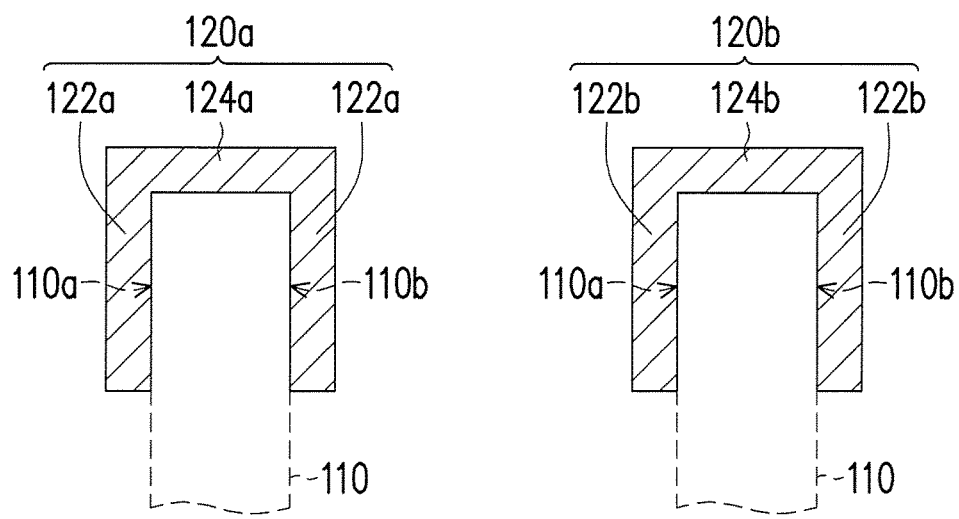
FIG. 4A is cross-sectional diagram illustrating the fixing component of FIG. 3 along a line I-I.
FIG. 4B is a cross-sectional diagram illustrating the fixing component of FIG. 3 along a line II-II.

FIG. 4A is cross-sectional diagram illustrating the fixing component of FIG. 3 along a line I-I. FIG. 4B is a cross-sectional diagram illustrating the fixing component of FIG. 3 along a line II-II. Referring to FIG. 4A, in the embodiment, the fixing section 120a includes two clipping portions 122a and one connection portion 124a, the connection portion 124a is connected between the two corresponding clipping portions 122a, and the corresponding connection side 110c (as marked in FIG. 3) is clipped between the two clipping portions 122a. Referring to FIG. 4B, similarly, the fixing section 120b includes two clipping portions 122b and one connection portion 124b, the connection portion 124b is connected between the two corresponding clipping portions 122b, and the corresponding connection side 110c (as marked in FIG. 3) is clipped between the two clipping portions 122b.

Referring to FIG. 1 through FIG. 3, in detail, each of the projection plates 110 of the embodiment includes a plate body 112, a first sidebar 114, and a plurality of second sidebars 116. In the embodiment, each of the projection surfaces 110a and each of the back surfaces 110b are formed at each of the corresponding plate bodies 112, each of the first sidebars 114 is disposed at the corresponding connection side 110c, and each of the first sidebars 114 is clipped at the corresponding fixing sections 120a or the corresponding fixing sections 120b. In the embodiment, as shown in FIG. 2, the second sidebars 116 and the corresponding first sidebar 114 of each of the projection plates 110 constitute a frame body, and the frame body frames the corresponding plate body 112. More specifically, as shown in FIG. 2 of the embodiment, the frame body constituted by the first sidebar 114 and the three second sidebars 116 of the projection plate 110 at the left side frames the plate body 112 at the left side, and the frame body constituted by the first sidebar 114 and the three second sidebars 116 of the projection plate 110 at the right side frames the plate body 112 at the right side.

However, in other embodiments, if it is intended to splice three projection plates 110 (e.g., a left projection plate, a middle projection plate, and a right projection plate), then the middle projection plate has a left first sidebar and a right first sidebar for respectively corresponding to the first sidebar of the left projection plate and the first sidebar of the right projection plate, and the middle projection plate has a top second sidebar and a bottom second sidebar, so that the two first sidebars (i.e., the left first sidebar and the right first sidebar) and the two second sidebars (i.e., the top second sidebar and the bottom second sidebar) of the middle projection plate may constitute a frame body for framing the middle projection plate.

In the embodiment, the first sidebar 114 is, for example, fixed at the plate body 112 by means of adhesion, and the first sidebar 114 and the second sidebars 116 are, for example, aluminum extrusion sidebars, but the invention are not limited thereto. In addition, referring to FIG. 5, the second sidebars 116 of each of the projection plates 110 are, for example, fixed to each other with assembly components 117 at the corners of the frame body, but the invention is not limited thereto. In other embodiments, the second sidebars 116 may also be fixed to each other with other proper components.

In the embodiment, two opposite sides of each of the first sidebars 114 are respectively clipped at the two corresponding fixing components 120 (i.e., the top fixing component 120 and the bottom fixing component 120), so that each of the first sidebar 114 is firmly fixed. In addition, as shown in FIG. 3, each of the first sidebars 114 and one of the two adjacent second sidebars 116 are together clipped at the corresponding fixing section 120a or fixing section 120b, so that each of the first sidebars 114 and the corresponding second sidebar 116 are fixed to each other. More specifically, as shown in FIG. 3, the first sidebar 114 at the left side and the top second sidebar 116 adjacent to the first sidebar 114 at the left side are together clipped at the top fixing section 120a at the left side, the first sidebar 114 at the left side and the bottom second sidebar 116 adjacent to the first sidebar 114 at the left side are together clipped at the bottom fixing section 120a at the left side, the first sidebar 114 at the right side and the top second sidebar 116 adjacent to the first sidebar 114 at the right side are together clipped at the top fixing section 120b at the right side, and the first sidebar 114 at the right side and the bottom second sidebar 116 adjacent to the first sidebar 114 at the right side are together clipped at the bottom fixing section 120b at the right side.

Referring to FIG. 2, the projection screen 100 of the embodiment further includes a plurality of lap joints 130, and each of the lap joints 130 laps at two first sidebars 114 that are leant against each other, so that the two projection plates 110 may be firmly combined/bonded with each other and the touch projection surface T constituted by the two projection surfaces 110a may be coplanar. Each of the lap joints 130 is, for example, a sheet metal, but the invention is not limited thereto. In other embodiments, the lap joints 130 may also be other types of components.

Figure 5:
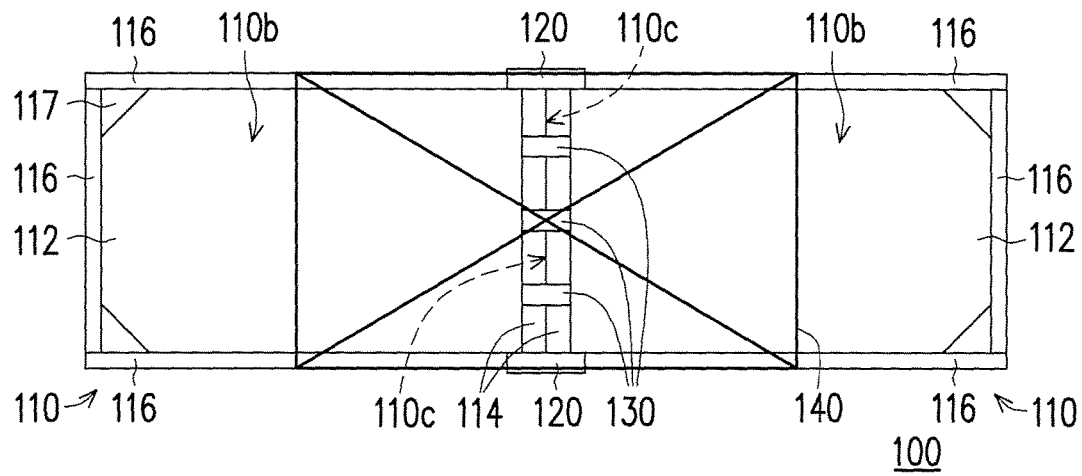
FIG. 5 is a structural schematic diagram illustrating a bracket added onto the projection screen according to one embodiment of the invention.

FIG. 5 is a structural schematic diagram illustrating a bracket added onto the projection screen according to one embodiment of the invention. As shown in FIG. 5, the projection screen 100 of the embodiment may be additionally disposed with at least one bracket 140 (illustrated as one bracket 140 for an example), and the bracket 140 is connected to the two projection plates 110 to enhance an overall structural strength of the projection screen 100, wherein the bracket 140 may be a light steel frame or an aluminum extrusion bracket. In the embodiment, a width of the bracket 140 is, for example, greater than a width of each of the fixing components 120, so as to reliably achieve the effect of enhancing the structural strength. However, in other embodiments, if it is intended to splice three projection plates 110 (e.g., a left projection plate, a middle projection plate, and a right projection plate), then the left projection plate and the middle projection plate may be connected by/to one bracket and the middle projection plate and the right projection plate may be connected by/to another bracket, wherein a width of each of the brackets is, for example, greater than a width of each of the fixing components, and thus the structural strength may be enhanced.

Figure 6:
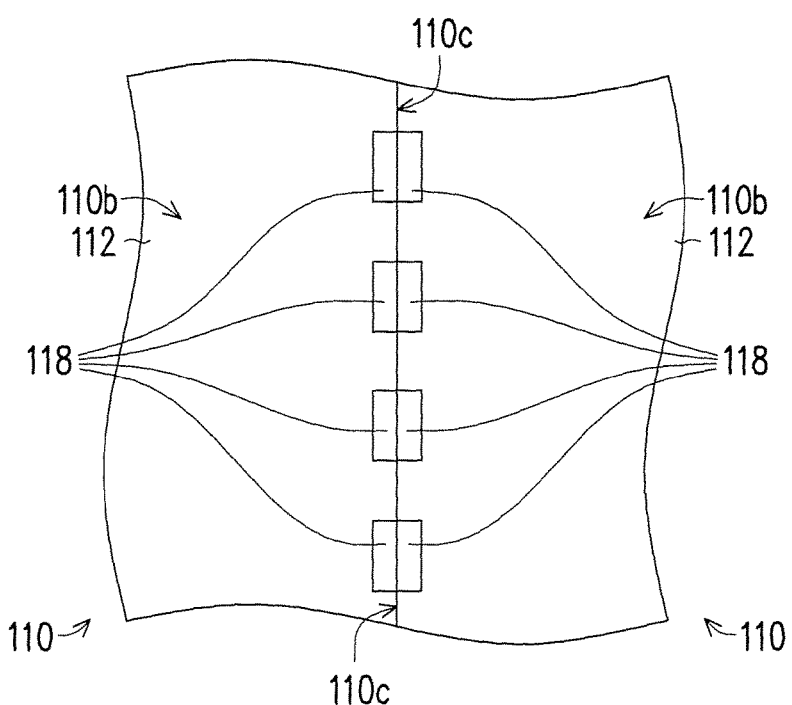
FIG. 6 is a partial structural schematic diagram of the projection screen of FIG. 1.
Figure 7:
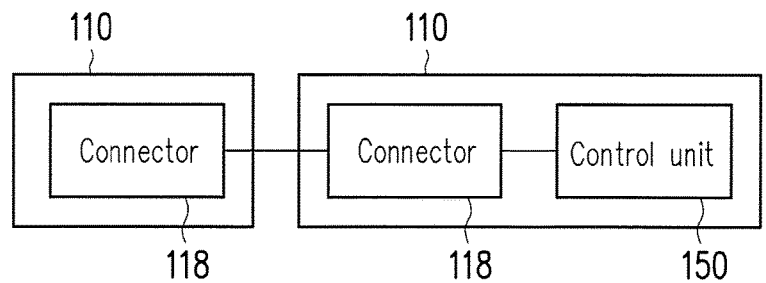
FIG. 7 is a block diagram illustrating partial components of the projection screen of FIG. 6.

FIG. 6 is a partial structural schematic diagram of the projection screen of FIG. 1. FIG. 7 is a block diagram illustrating partial components of the projection screen of FIG. 6. Referring to FIG. 6, in the embodiment, each of the projection plates 110 has at least one connector 118, such as an input/output connector (I/O connector) or an interconnection structure which enables a mutual communication for electric signals, but the invention is not limited thereto. Each of the projection plates 110 in FIG. 6 has, for example, four connectors 118. Each of the connectors 118 is disposed at the back surfaces 110b of the projection plates 110, and each of the connectors 118 is disposed at the corresponding connection side 110c. The two projection plates 110 are electrically connected with each other through the connectors 118. More specifically, in the embodiment, the four connectors 118 of the projection plate 110 at the left side are disposed at left the connection side 110c, the four connectors 118 of the projection plate 110 at the right side are disposed at right the connection side 110c, and thus the two projection plates 110 at both the left and right sides may be electrically connected with each other by the four connectors 118 at the left side being electrically connected with the four connectors 118 at the right side.

In view of the above, as shown in FIG. 7, the projection screen 100 further includes a control unit 150, the control unit 150 is, for example, disposed at the projection plate 110 at the right side and electrically connected to the connector 118 in the projection plate 110 at the right side, and the connector 118 of the projection plate 110 at the left side are electrically connected to the connector 118 of the projection plate 110 at the right side. That is to say, in the embodiment, through having the connectors 118 of the projection plates 110 being electrically connected with each other, touch signals generated on the touch projection surface T of the projection plates 110 are adapted to be transmitted, and the control unit 150 is, for example, disposed at the back surface 110b of one of the projection plates 110 and electrically connected to the corresponding connector 118 for controlling touch functions of the projection plates 110.

Figure 8A:
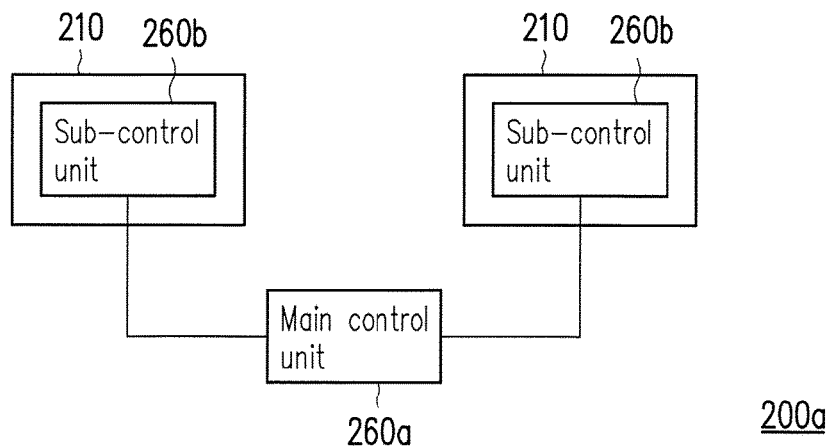
FIG. 8A is a block diagram illustrating partial components of the invention according to one embodiment.

However, when the connection sides of the projection plates 210 do not have the connectors, the splicing of a plurality of projection plates 210 may achieved with the schema illustrated in FIG. 8A. In the embodiment of FIG. 8A, the projection screen 200a further includes a main control unit 260a and two sub-control units 260b, the two sub-control units 260b are respectively disposed at the two projection plates 210 and electrically connected to the main control unit 260a, and the main control unit 260a is adapted to control the touch functions of the projection plates 210 through the sub-control units 260b. Specifically, each of the projection plates 210 and the corresponding sub-control unit 260b thereof may be considered as an independent touch interface, and the main control unit 260a may integrate the two projection plates 210 into a single touch interface when the two projection plates 210 are bonded together.

Figure 8B:
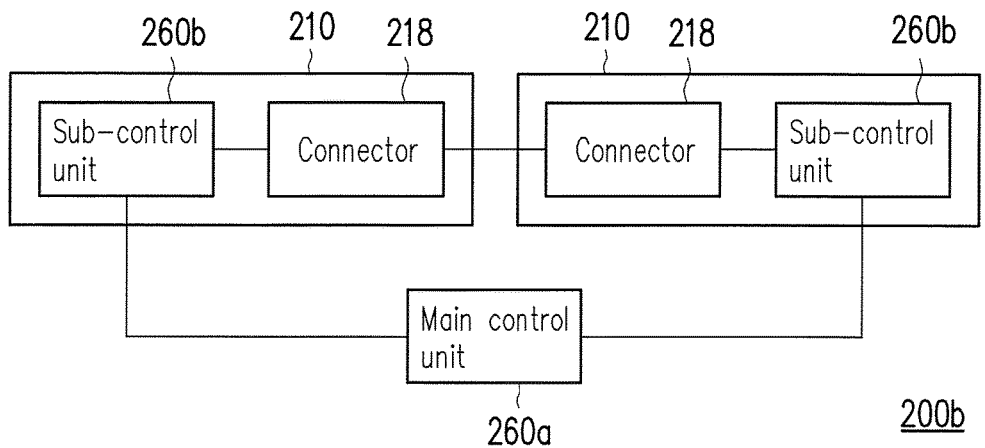
FIG. 8B is a block diagram illustrating partial components of the invention according to another embodiment.

FIG. 8B is a block diagram illustrating partial components of the invention according to another embodiment. In the projection screen 200b of the FIG. 8B, configurations of the projection plates 210 and the connectors 218 are similar to configurations of the projection plates 110 and the connectors 118 of FIG. 7, and thus will not be repeated. Differences between the projection screen 200b and the projection screen 100 lie in that, the projection screen 200b further includes a main control unit 260a and two sub-control units 260b, the sub-control units 260b are respectively disposed at the two projection plates 210 and electrically connected to the main control unit 260a, and the main control unit 260a is adapted to control the touch functions of the projection plates 210 through the sub-control units 260b. Specifically, each of the projection plates 210 and the corresponding sub-control unit 260b thereof may be considered as an independent touch interface, and the main control unit 260a may integrate the two projection plates 210 into a single touch interface when the two projection plates 210 are bonded together. In addition, in the embodiment, since the two projection plates 210 are electrically connected with each other through two connectors 218, signal transmissions between the two projection plates 210 may be not limited to the signal transmissions between the main control unit 260a and the two sub-control units 260b, such that the signal transmissions may further be performed through the electrical connections of the connectors 218.

In the previous embodiment, the control unit 150, the main control unit 26a, and the sub-control units 260b are not limited to hardware or software for processing the touch signals, and may, for example, be controllers, micro-controller unit, programmable controller, central processing unit (CPU), micro processor, application specific integrated circuits (ASIC), programmable logic device (PLD), processing software or control software, but the invention is not limited to the aforementioned hardware and software.

Figure 9:
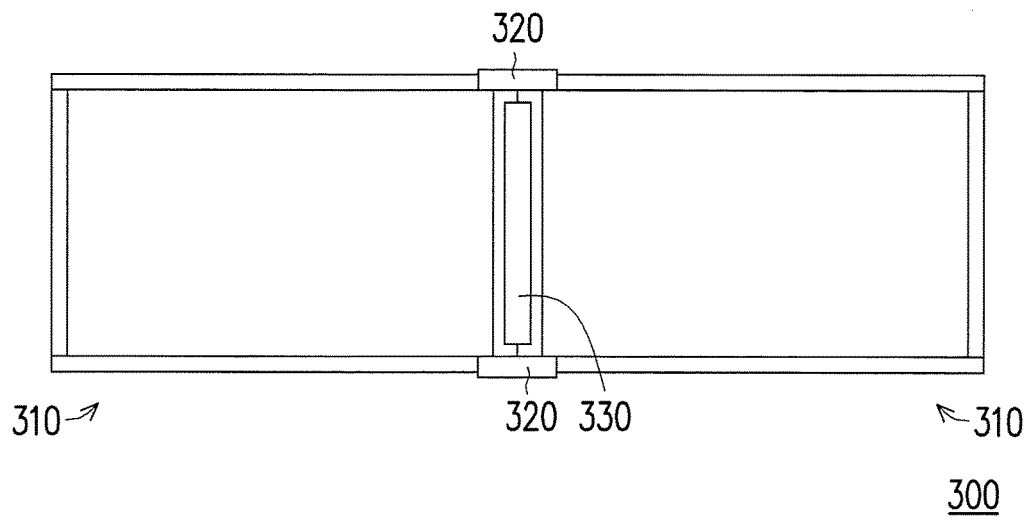
FIG. 9 is a rear view of a projection screen illustrated according to another embodiment of the invention.

FIG. 9 is a rear view of a projection screen illustrated according to another embodiment of the invention. In the projection screen 300 of FIG. 9, configurations of the projection plates 310 and the fixing components 320 are similar to configurations of the projection plates 110 and the fixing components 120 of FIG. 2, and thus will not be repeated. Differences between the projection screen 300 and the projection screen 100 lie in that, a size of the lap joint 330 of the projection screen 300 is greater than the size of the lap joint(s) 130 of the projection screen 100, and the two projection plates 310 are lapped/jointed by the single lap joint 330. However, the sizes, the appearances, and the lapping/jointing approaches of the lap joints 130 in FIG. 2 and the lap joint 330 in FIG. 9 are merely provided as examples for the illustration, the invention is not limited thereto.

Figure 10:
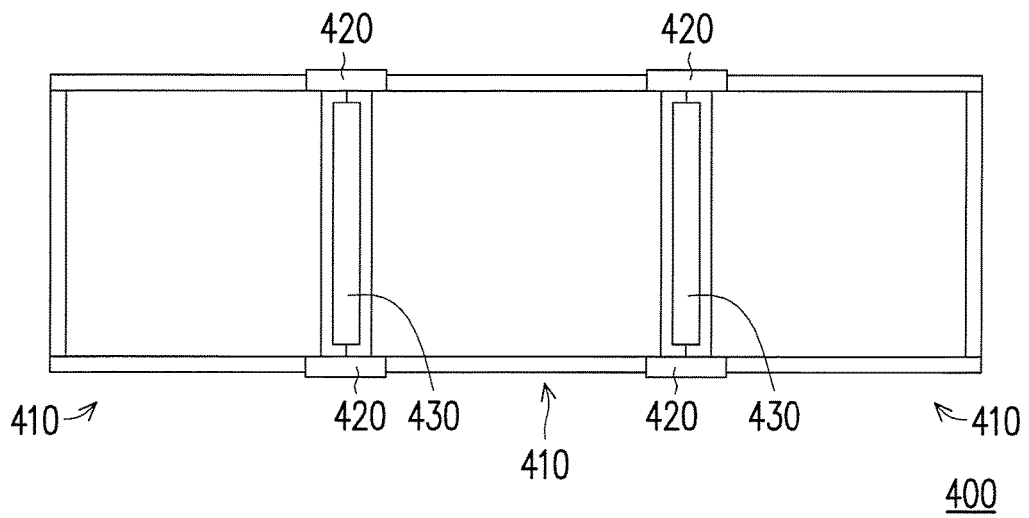
FIG. 10 is a rear view of a projection screen illustrated according to another embodiment of the invention.

FIG. 10 is a rear view of a projection screen illustrated according to another embodiment of the invention. In the projection screen 400 of FIG. 10, configurations of the projection plates 410, the fixing components 420, and the lap joints 430 are similar to configurations of the projection plates 310, the fixing components 320, and the lap joint 330 of FIG. 9, and thus will not be repeated. Differences between the projection screen 400 and the projection screen 300 lie in that, the number of the projection plates 410 of the projection screen 400 is three, and the projection plates 410 are bonded with each other through correspondingly using more numbers of the fixing components 420 (e.g., four) and more numbers of the lap joints 430 (e.g., two). In other embodiments, more numbers of the projection plates may be bonded with each other through using the same/similar approach, and the invention is not limited thereto. Moreover, in other embodiments, the lapping/jointing approach of the lap joints 430 in FIG. 10 may also be changed to the lapping/jointing approach used for the lap joint 130 in FIG. 2, but the invention is still not limited thereto.

Figure 11:
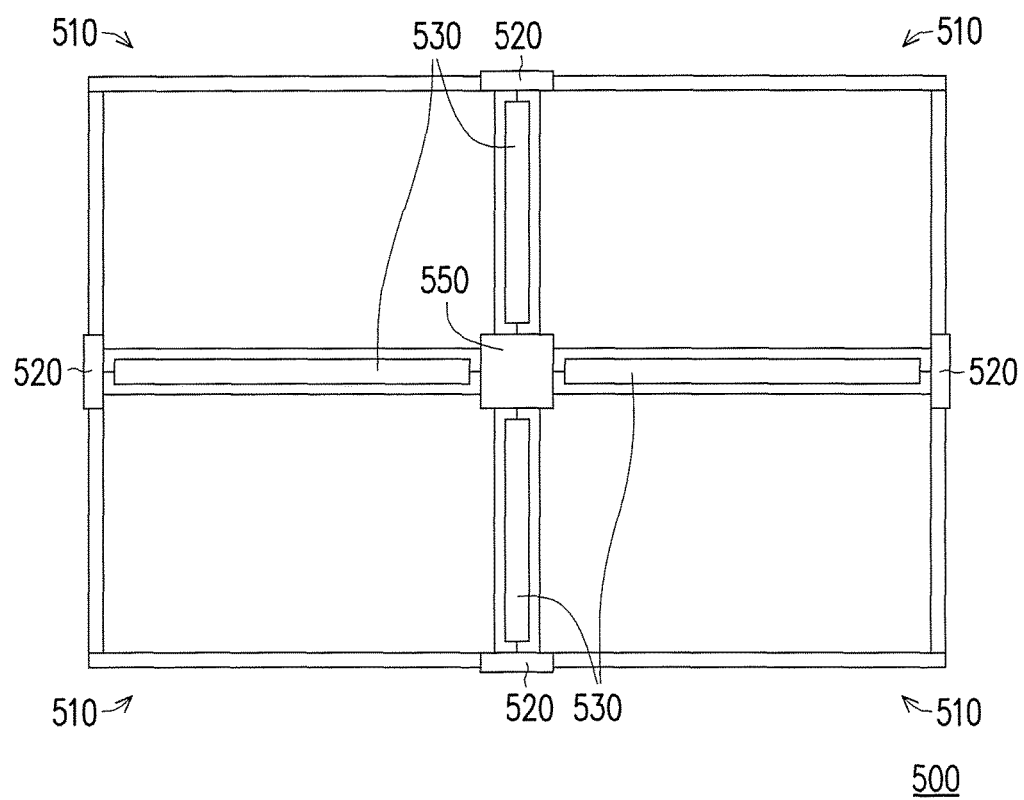
FIG. 11 is a rear view of a projection screen illustrated according to another embodiment of the invention.

FIG. 11 is a rear view of a projection screen illustrated according to another embodiment of the invention. In the projection screen 500 of FIG. 11, configurations of the projection plates 510, the fixing components 520, and the lap joints 530 are similar to configurations of the projection plates 310, the fixing components 320, and lap joint 330 of FIG. 9, and thus will not be repeated. Difference between the projection screen 500 and the projection screen 300 lie in that, the number of the projection plates 510 of the projection screen 500 is four, and the projection plates 50 are bonded with each other through correspondingly using more numbers of the fixing components 520 (e.g., four) and more numbers of the lap joints 530 (e.g., two) in a manner of array splicing. In addition, at the center of the projection screen 500, the projection plates 510 may further be fixed through using another fixing component 550 by means of locking, engagement or clipping. In other embodiments, more numbers of the projection plates may be bonded with each other through using the same/similar approach, and the invention is not limited thereto.

In summary, the embodiments of the invention have at least one of the advantages below. In the embodiments of the invention, the projection screen is formed by assembling/splicing a plurality of projection plates, and the projection plates may be separated from each other and be stacked to have the shorter length and the shorter width, so the projection screen is convenient to transport and install. Moreover, in the embodiments of the invention, by the two fixing sections of the fixing components to respectively clipping at the two connection sides of two adjacent projection plates, the two adjacent projection plates may be fully bonded with each other and the two projection surfaces of the two adjacent projection plates may together constitute the planar touch projection surface, and thus the projection screen may present a good/favorable projection image and enable the user to perform the touch inputs smoothly. Moreover, in the embodiments of the invention, through using the lap joints to lap/joint two adjacent first sidebars of the two projection plates, the two projection plates may be firmly bonded with each other and the touch projection surface constituted by the two projection surface may be planar.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection screen, comprising:
 a plurality of projection plates, wherein each of the projection plates has a projection surface and at least one connection side, the projection surfaces of the projection plates lean against each other to be coplanar through the connection sides;
 at least one fixing component, comprising two fixing sections connected with each other, wherein the two connection sides leant against each other are respectively clipped at the two fixing sections, each of the projection plates comprises a plate body and at least one first sidebar, each of the projection surfaces is formed at the corresponding plate body, and each of the first sidebars is disposed at the corresponding connection side and clipped at the corresponding fixing section; and
 at least one lap joint, lapping at the two first sidebars leant against each other.

2. The projection screen as recited in claim 1, wherein the projection surfaces are adapted to receive a projection beam from a projection device.

3. The projection screen as recited in claim 1, wherein each of the projection plates is a touch projection plate, and the projection surfaces together constitute a touch projection surface.

4. The projection screen as recited in claim 1, wherein each of the fixing sections comprises two clipping portions and a connection portion, each of the connection portions is connected between the two corresponding clipping portions, and each of the connection sides is clipped between the two corresponding clipping portions.

5. The projection screen as recited in claim 1, wherein the two fixing sections are integrally connected with each other.

6. The projection screen as recited in claim 1, wherein each of the projection plates further comprises a plurality of second sidebars, the second sidebars of each of the projection plates and the at least one first sidebar constitute a frame body, and each of the frame bodies frames the corresponding plate body.

7. The projection screen as recited in claim 6, wherein each of the first sidebars and one of the adjacent second sidebars are together clipped at the corresponding fixing section.

8. The projection screen as recited in claim 1, wherein the number of the at least one fixing component is a plurality, and two opposite sides of each of the first sidebars are respectively clipped at the two corresponding fixing components.

9. The projection screen as recited in claim 1, further comprising at least one bracket, wherein the at least one bracket is connected to the projection plates, and a width of the at least one bracket is greater than a width of the at least one fixing component.

10. The projection screen as recited in claim 1, wherein each of the projection plates has at least one connector, each of the connectors is disposed at the corresponding connection side, and the projection plates are electrically connected with each other through the connectors.

11. The projection screen as recited in claim 1, further comprising a control unit, wherein the control unit is disposed at one of the projection plates and is adapted to control the projection plates.

12. The projection screen as recited in claim 1, further comprising a main control unit and a plurality of sub-control units, wherein the sub-control units are respectively disposed at the projection plates and electrically connected to the main control unit, and the main control unit is adapted to control the projection plates through the sub-control units.

13. A projection screen, comprising:
a plurality of projection plates, wherein each of the projection plates has a projection surface and at least one connection side, the projection surfaces of the projection plates lean against each other to be coplanar through the connection sides;
at least one fixing component, comprising two fixing sections connected with each other, wherein the two connection sides leant against each other are respectively clipped at the two fixing sections,
wherein each of the projection plates comprises a plate body, at least one first sidebar and a plurality of second sidebars, each of the projection surfaces is formed at the corresponding plate body, each of the first sidebars is disposed at the corresponding connection side and clipped at the corresponding fixing section, the second sidebars of each of the projection plates and the at least one first sidebar constitute a frame body, and each of the frame bodies frames the corresponding plate body, wherein each of the first sidebars and one of the adjacent second sidebars are together clipped at the corresponding fixing section.

14. A projection screen, comprising:
a plurality of projection plates, wherein each of the projection plates has a projection surface and at least one connection side, the projection surfaces of the projection plates lean against each other to be coplanar through the connection sides; and
at least one fixing component, comprising two fixing sections connected with each other, wherein the two connection sides leant against each other are respectively clipped at the two fixing sections, each of the projection plates comprises a plate body and at least one first sidebar, each of the projection surfaces is formed at the corresponding plate body, and each of the first sidebars is disposed at the corresponding connection side and clipped at the corresponding fixing section,
wherein the number of the at least one fixing component is a plurality, and two opposite sides of each of the first sidebars are respectively clipped at the two corresponding fixing components.

15. A projection screen, comprising:
a plurality of projection plates, wherein each of the projection plates has a projection surface and at least one connection side, the projection surfaces of the projection plates lean against each other to be coplanar through the connection sides;
at least one fixing component, comprising two fixing sections connected with each other, wherein the two connection sides leant against each other are respectively clipped at the two fixing sections; and
at least one bracket, wherein the at least one bracket is connected to the projection plates, and a width of the at least one bracket is greater than a width of the at least one fixing component.

* * * * *